United States Patent [19]

Konno et al.

[11] Patent Number: 5,050,631
[45] Date of Patent: Sep. 24, 1991

[54] FLUID DIVERGING SYSTEM

[75] Inventors: Mitsuo Konno; Masaki Kawada; Mamoru Machida; Hisashi Noro, all of Sayama, Japan

[73] Assignee: Honda Giken Kogyo Kabushiki Kaisha, Tokyo, Japan

[21] Appl. No.: 637,963

[22] Filed: Jan. 9, 1991

Related U.S. Application Data

[63] Continuation of Ser. No. 397,550, Aug. 23, 1989, abandoned.

[51] Int. Cl.$^5$ .............................................. F16L 39/04
[52] U.S. Cl. .................................... 137/270; 137/271; 137/56
[58] Field of Search ............... 137/561 A, 561 R, 270, 137/271, 884

[56] References Cited

U.S. PATENT DOCUMENTS

| | | | |
|---|---|---|---|
| 3,234,963 | 2/1966 | Lyon | 137/884 |
| 3,506,029 | 4/1970 | Demler, Sr. et al. | 137/561 R |
| 3,589,387 | 6/1971 | Raymond | 137/271 |
| 3,888,518 | 6/1975 | Delessert | 137/271 X |
| 3,934,605 | 1/1976 | Legris | 137/271 |
| 4,247,133 | 1/1981 | Möller | 137/271 X |
| 4,770,341 | 9/1988 | Drake | 137/271 X |
| 4,848,391 | 7/1989 | Miller et al. | 137/270 |

Primary Examiner—John Rivell
Attorney, Agent, or Firm—Armstrong, Nikaido, Marmelstein, Kubovcik & Murray

[57] ABSTRACT

A fluid diverging system provides a passageway for supplying a fluid from a single supply source to a plurality of sections requiring the use of the fluid and for discharging the fluid from these sections to a single discharge portion. The fluid diverging system includes a plurality of fluid diverging blocks separably connected to one another longitudinally in a row. Each of the blocks has a through-hole longitudinally passed therethrough, and a communication passage communicating with the through-hole and capable of being connected to external fluid transfer means. Joint means connecting these blocks enable a fluid-tight communication of these blocks with one another. This makes it possible to use the fluid diverging system in an optical form only by increasing or decreasing the number of the fluid diverging blocks in accordance with an increase or decrease in number of the section requiring the use of the fluid.

9 Claims, 15 Drawing Sheets

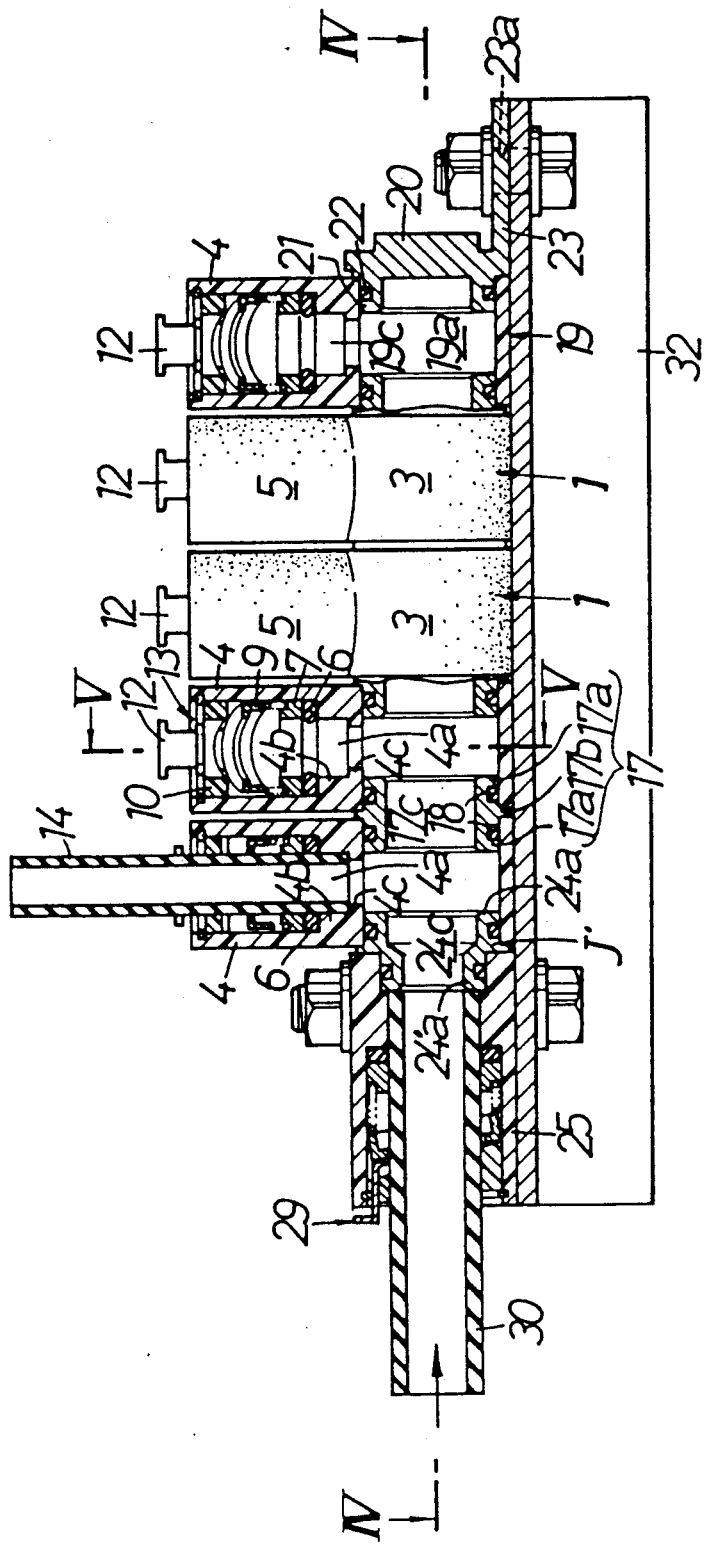

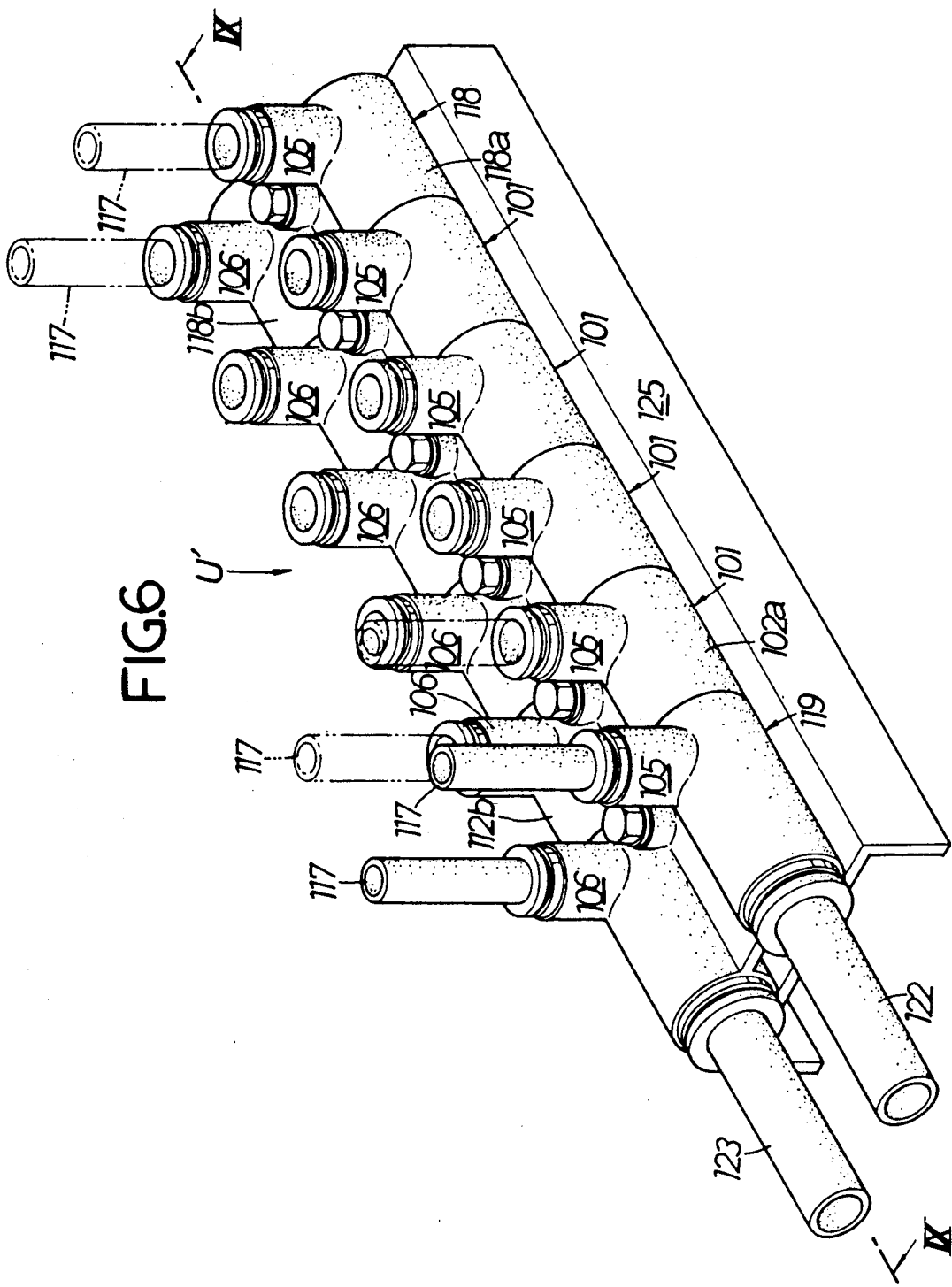

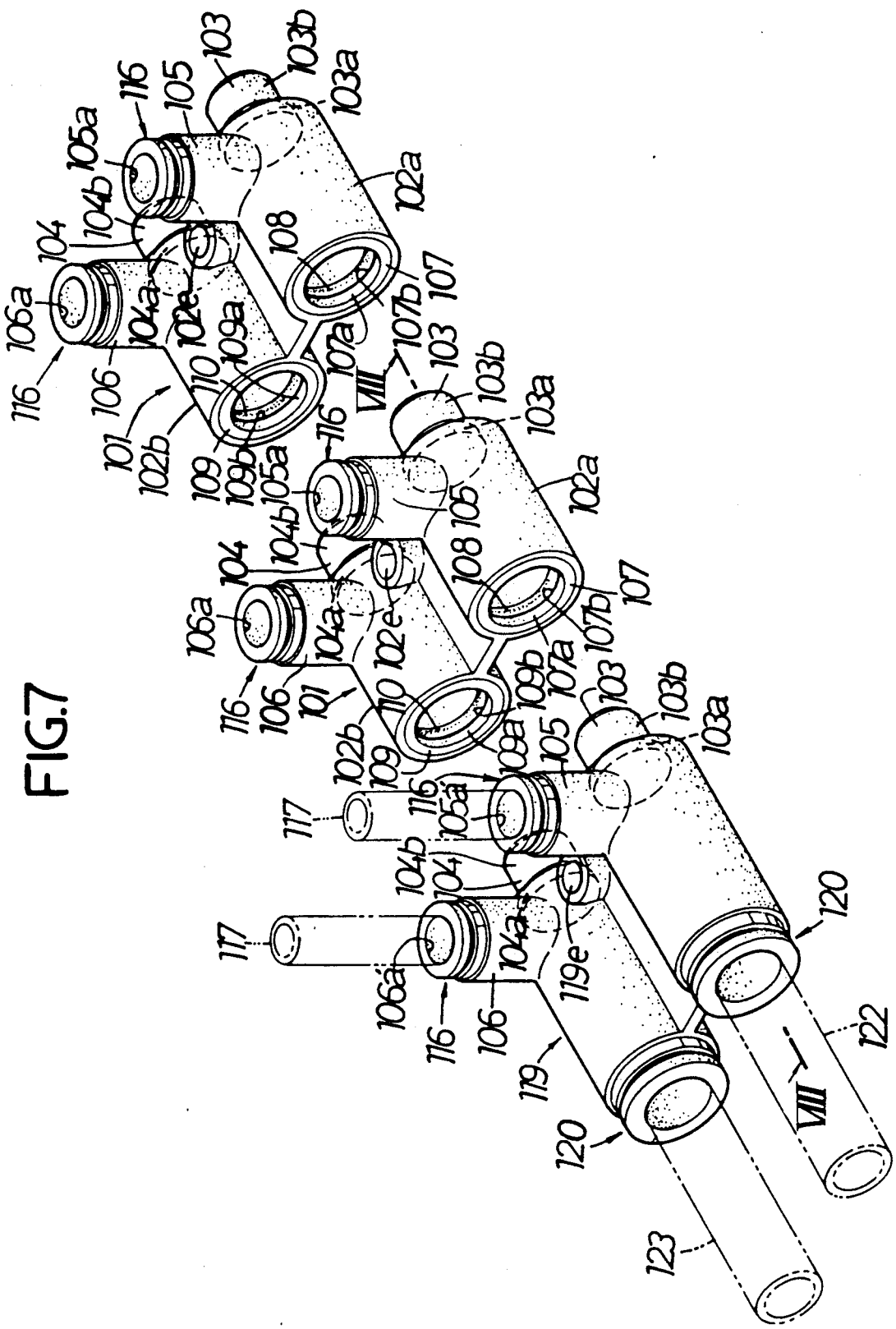

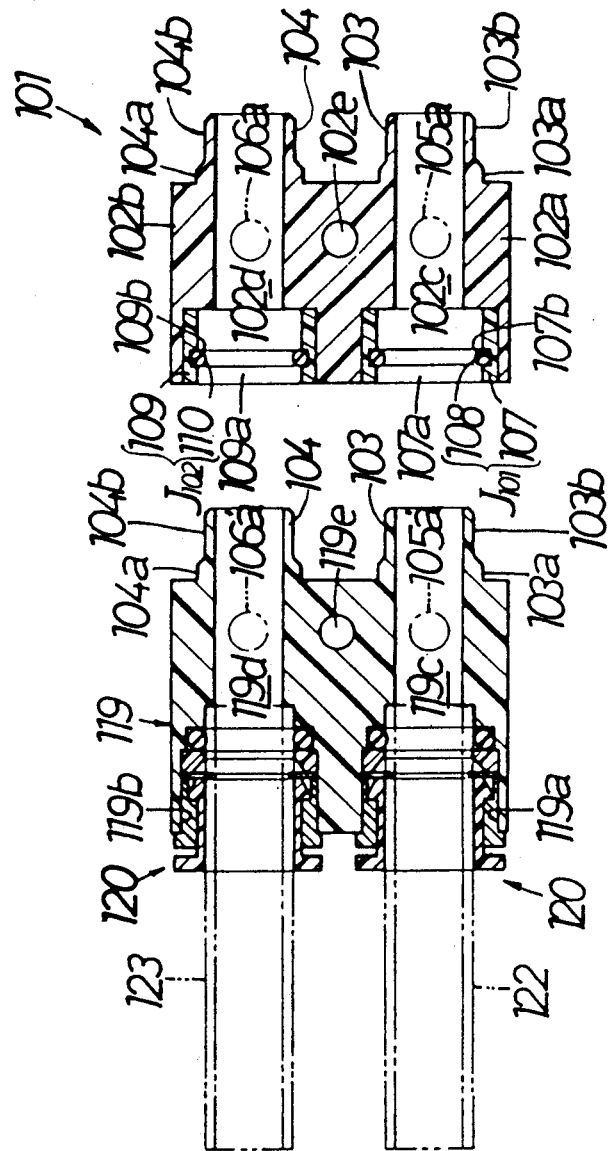

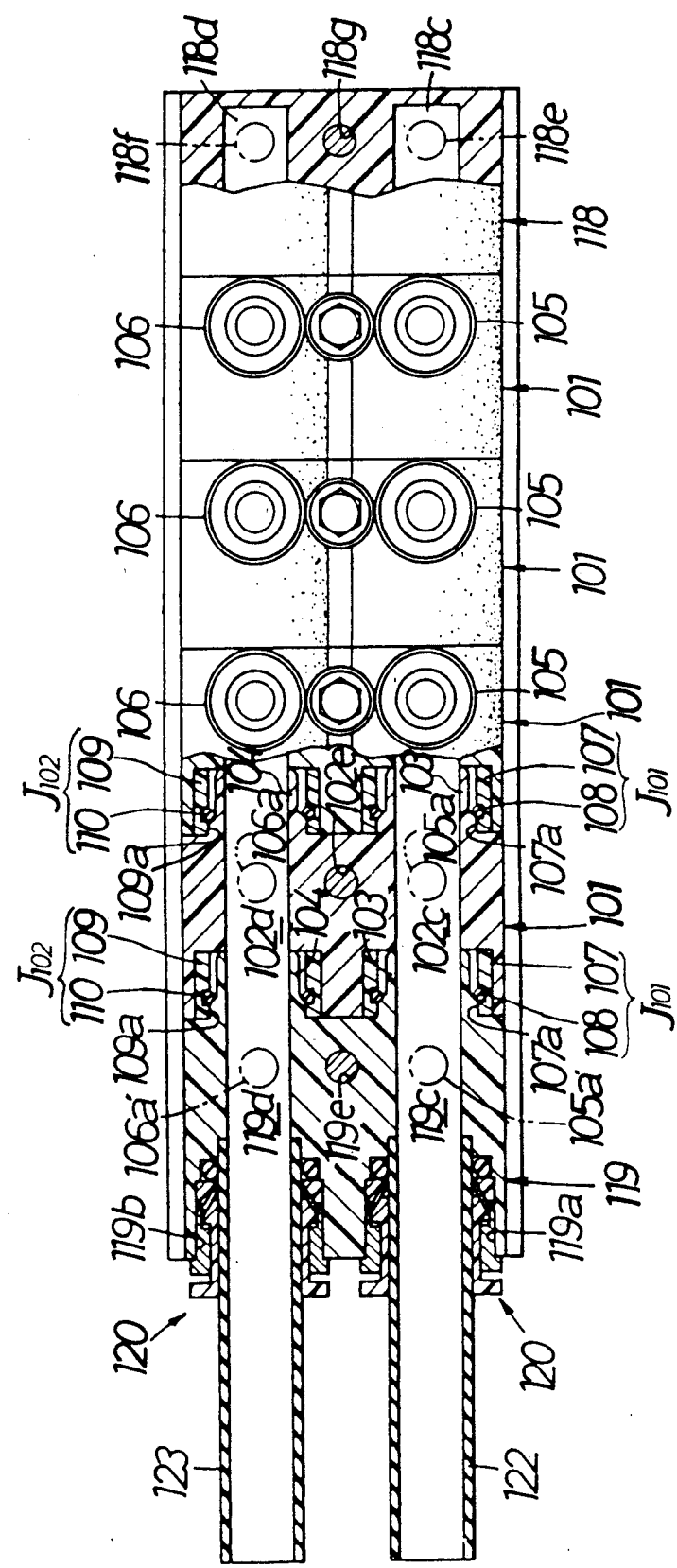

FLUID DIVERGING SYSTEM

This application is a continuation of application Ser. No. 397,550 filed Aug. 23, 1989, now abandoned.

BACKGROUND OF THE INVENTION:

The field of the present invention is fluid diverging systems.

Such fluid diverging systems are used to diverge a single flow passage into a plurality of flow passages. For example, it is used to distribute a fluid such as air, a cooling water, etc., from a single flow passage into a plurality of welding devices.

The fluid diverging systems of the above type which have been conventionally known include, for example, one having a construction shown in FIG. 18. A block 01 shown in FIG. 18 has a front face 01a, a rear face 01b and an upper surface 01c. The block 01 is provided with a fluid supplying bottomed hole 02 and a fluid discharging bottomed hole 03 which are elongated from the front face 01a toward the rear face 01b. The block 01 is also provided with a plurality of fluid supplying communication passages 04, 04—and a plurality of fluid discharging communication passages 05, 05—which extend from the upper surface 01c thereof and communicate with the fluid supplying and discharging bottomed holes 02 and 03, respectively. Hose connecting members 06, 06—are coupled to the fluid supplying communication passages 04, 04—and the fluid discharging communication passages 05, 05—. Thus, a fluid supplied to the fluid supplying bottomed hole 02 is supplied from the fluid supplying communication passages 04, 04—to predetermined places requiring the fluid. Then, the fluid supplied to the predetermined places is circulated as necessary through the fluid discharging communication passages 05, 05—into the fluid discharging bottomed hole 03 in the block 01 and discharged out of the hole 03.

When the block 01 constructed in the above manner is used for distribution of air, the air is consumed at air-requiring places of the welding devices and hence, need not be circulated into the block 01. Accordingly, in this case, the fluid discharging bottomed hole 03 and the fluid discharging communication passages 05, 05—are also used as a fluid supplying bottomed hole and fluid supplying communication passages, respectively.

In the prior art fluid diverging system shown in FIG. 18, however, the following problem is encountered: For every change of the number of branched pipes to distribute the fluid, the number of each of the fluid supplying communication passages 04, 04—and the fluid discharging communication passages 05, 05—connected to the branched pipes in correspondence in number with the branched pipes must be changed. If so, the fluid diverging system must be remade. Thereupon, a method may be considered in which a large number of fluid supplying communication passages 04, 04—and a large number of fluid discharging communication passages 05, 05—are previously formed so that they can be connected to a large number of branched pipes, and the fluid supplying and discharging communication passages 04, 04—and 05, 05—which are not in use are closed. However, this method is accompanied by a problem that the fluid diverging system is increased in size more than required, resulting in an inconvenient usage.

SUMMARY OF THE INVENTION:

The present invention has been accomplished with the above circumstances in view, and it is an object of the present invention to provide a fluid diverging system having a construction which is capable of readily accommodating a change of the number of branched pipes used, if so, without increasing the size of the system more than required.

To attain the above object, according to the present invention, there is proposed a fluid diverging system comprising a plurality of fluid diverging blocks separately connected longitudinally in a row to one another and each having therein, a through-hole longitudinally passed therethrough and a communication passage communicating with the through-hole and capable of being connected to external fluid transfer means; means for closing the through-hole in rear end one of the fluid diverging blocks; and joint means mounted between the individual adjacent two of the plurality of the fluid diverging blocks to connect the fluid diverging blocks and to put the through-holes in the fluid diverging blocks into fluid-tight communication with one another.

With the above construction, the fluid diverging blocks can be longitudinally coupled to or separated from one another as necessary, and in doing so, the joint means ensure the fluid-tight communication of the through-holes in the fluid diverging blocks with one another. Therefore, it is possible to properly increase or decrease the number of the fluid diverging blocks by an extremely simple operation to readily provide a fluid diverging system having a desired number of the fluid communication passages. The ability to increase or decrease the number of the fluid diverging blocks makes it possible to use a system at an appropriate size at any time.

The above and other objects, features and advantages of the invention will become apparent from a reading of the following description of the preferred embodiments, taken in conjunction with the accompanying drawings.

BRIEF DESCRIPTION OF THE DRAWINGS:

The above and other objects and the attendant advantages of the present invention will become readily apparent by reference to the following detailed description where considered in conjunction with the accompanying drawings wherein:

FIGS. 1 to 5 illustrate a first embodiment of the present invention wherein

FIG. 1 is a perspective view of an entire fluid diverging system of the first embodiment;

FIG. 2 is an exploded perspective view of a fluid diverging block and a joint;

FIG. 3 is a partially longitudinal sectional side view taken along a line III—III in FIG. 1;

FIG. 4 is partially cross-sectional view taken along a line IV—IV in FIG. 3; and FIG. 5 is an enlarged sectional view along a line V—V in FIG. 3;

FIGS. 6 to 13 illustrate a second embodiment wherein

FIG. 6 is a perspective view of an entire fluid diverging system of the second embodiment;

FIG. 7 is an exploded perspective view of components for the fluid diverging system;

FIG. 8 is a sectional plan view taken along a line VIII—VIII in FIG. 7;

FIG. 9 is a sectional side view taken along a line IX—IX in FIG. 6;

FIG. 10 is a sectional plan view taken along a line X—X in FIG. 9;

FIG. 11 is a back view taken from a direction of an arrow XI in FIG. 9;

FIG. 12 is an enlarged view of an essential portion; and

FIG. 13 is a sectional view taken along a line XIII—XIII in FIG. 12.

FIGS. 14 to 17 illustrate a third embodiment of the present invention, wherein

FIG. 14 is a perspective view of an entire fluid diverging system of the third embodiment;

FIG. 15 is an exploded perspective view of components for the fluid diverging system;

FIG. 16 is a partially longitudinal sectional side view taken along a line XVI—XVI in FIG. 14; and FIG. 17 is a partially longitudinal sectional view taken along a line XVII—XVII in FIG. 16.

DESCRIPTION OF THE PREFERRED EMBODIMENT

Several embodiments of the present invention will now be described with reference to the accompanying drawings.

Figure 2:
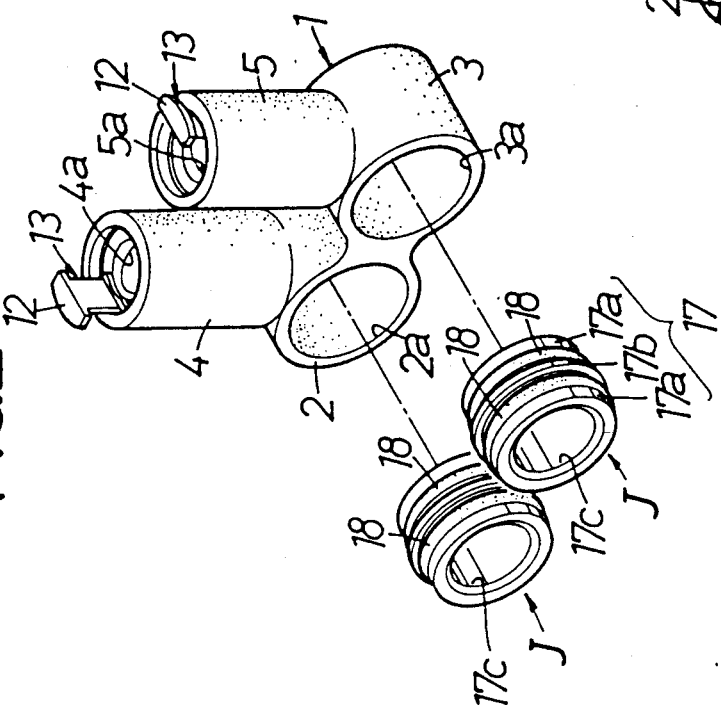
Figure 1:
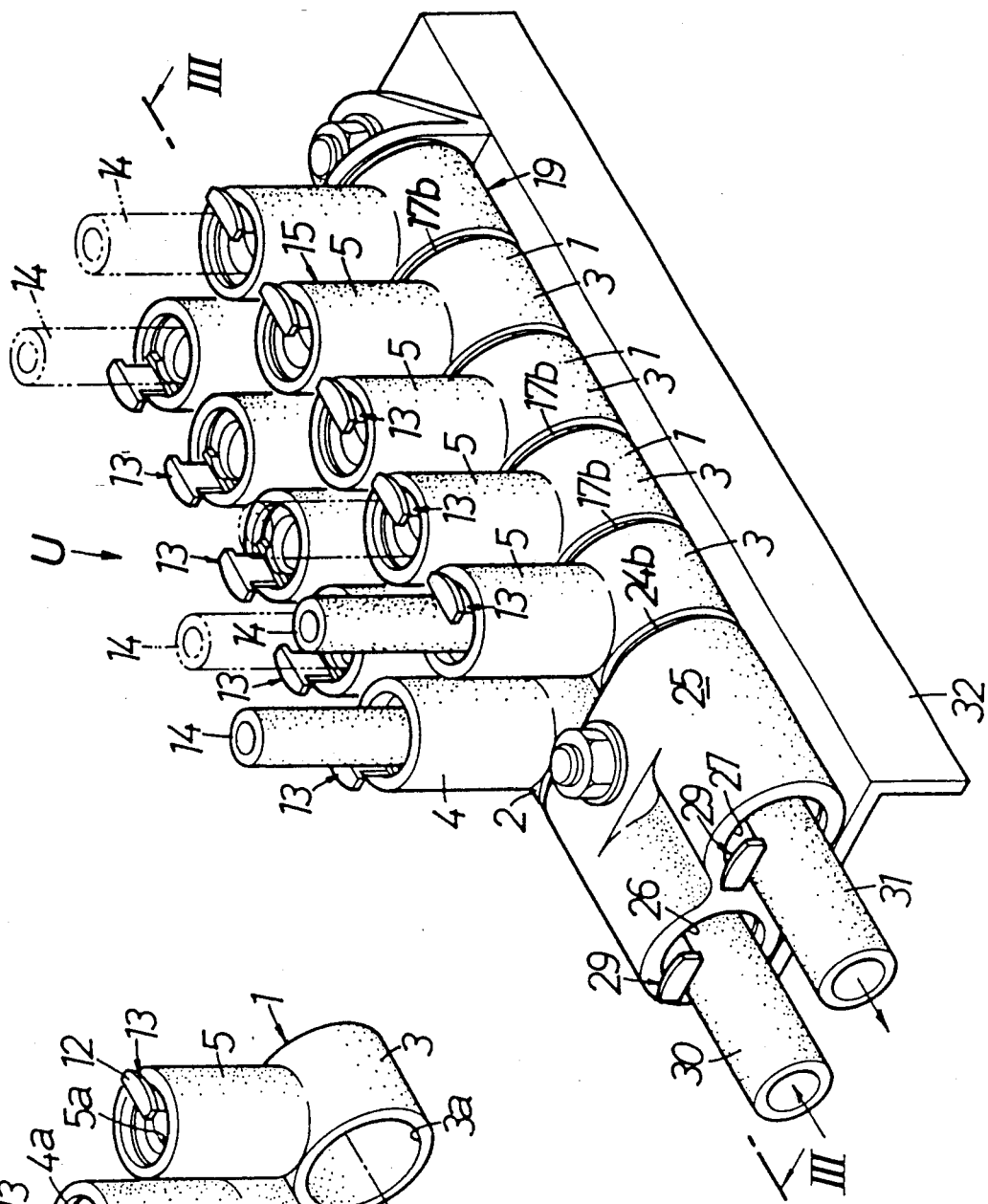
Figure 4:
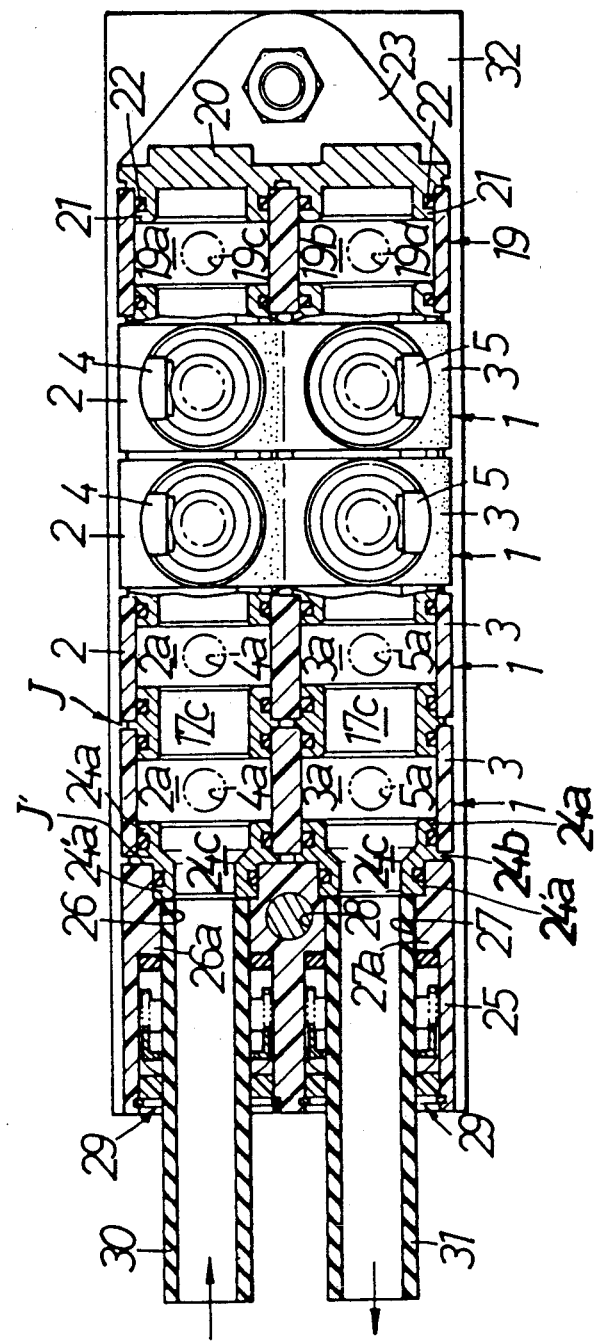

A first embodiment of the present invention will first be described with reference to FIGS. 1 to 5. Referring to FIGS. 1 and 2, a fluid diverging system U includes a plurality of (four, in the illustrated embodiment) fluid diverging blocks 1 longitudinally coupled to one another. Each of the fluid diverging blocks 1 comprises a pair of horizontal cylindrical portions 2 and 3 which extend longitudinally, and a pair of vertical cylindrical portions 4 and 5 mounted on upper portions of the corresponding horizontal cylindrical portions 2 and 3. These horizontal and vertical cylindrical portions 2, 3 and 4, 5 are integrally formed from a hard synthetic resin. One of the horizontal cylindrical portions 2 has a fluid supplying through-hole 2a made therethrough as a fluid through-hole which passes through the cylindrical portion 2 all the way from its front face to its rear face, and the other horizontal cylindrical portion 3 has a fluid discharging through-hole 3a made therethrough as a fluid through-hole which passes through the cylindrical portion 3 all the way from its front face to its rear face. One of the vertical cylindrical portions 4 has a fluid supplying communication passage 4a made therein as a fluid communication passage. The fluid supplying communication passage 4a passes through the cylindrical portion 4 to extend from an upper surface of the horizontal cylindrical portion 2 to the fluid supplying communication hole 2a. The other vertical cylindrical portion 5 has a fluid discharging communication passage 5a made therein as a fluid communication passage. The fluid discharging communication passage 5a passes through the vertical cylindrical portion 5 to extend from an upper surface of the horizontal cylindrical portion 3 to the fluid discharging through-hole 3a.

Figure 5:
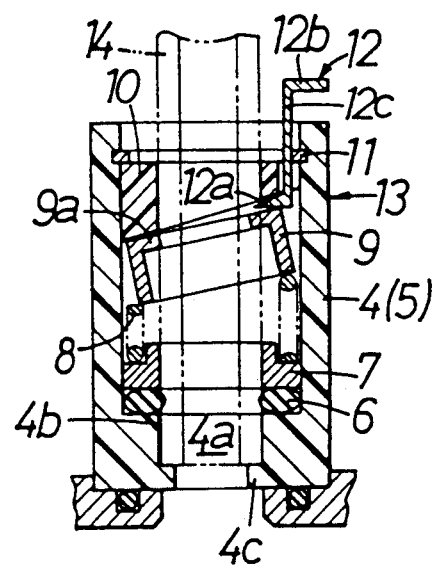

As apparent from FIGS. 3 and 5, the fluid supplying communication passage 4a has an upper stepped portion 4b formed at a boundary between an upper larger diameter portion and a lower smaller diameter portion, and a lower stepped portion 4c formed at a lower end of the smaller diameter portion. Placed above the upper stepped portion 4b are, in sequence from the below, a sealing member 6, a spring seat 7, a compression coiled spring 8 and a locking cylindrical member 9. A locking flange 9a is provided on the locking cylindrical member 9 to project radially inwardly. A cylindrical member 10 having a lower inclined surface is disposed on an upper surface of the locking flange 9a and has an upper end positioned by a slip-out preventing ring 11. As shown in FIG. 5, a lower horizontal end 12a of a disconnecting element 12 is inset between a thinnest portion of the cylindrical member 10 having the lower inclined-surface and the locking flange 9a. A vertical intermediate portion 12c connecting the lower horizontal end 12a with an upper horizontal end 12b extends upwardly outside the cylindrical member 10. A snap coupler 13 is constituted from the above-described members designated by the reference characters 6 to 12. To connect a connecting pipe 14 as fluid transfer means to the fluid supplying communication passage 4a as shown in FIG. 1, the connecting pipe 14 may be pushed into the fluid supplying communication passage 4a from above the cylindrical member 10. In doing so, the connecting pipe 14 is engaged with the locking cylindrical member 9, as can be readily surmised from FIG. 5. Therefore, the connecting pipe 14 can be readily pushed into the fluid supplying communication passage 4a while moving the locking cylindrical member 9 from its original inclined state toward a substantially horizontal state against a force of the compression coiled spring 8. Thereafter, the cylindrical locking portion 9 becomes an inclined state as shown in FIG. 5. At this time, the locking flange 9a engages the connecting pipe 14. Thus, in this state, the connecting pipe 14 cannot slip out of the fluid supplying communication passage 4a.

When the connecting pipe 14 is to be withdrawn, the disconnecting element 12 may be pushed downwardly. If doing so, the cylindrical member 9 is brought into the substantially horizontal state, so that the engagement of the locking flange 9a with the pipe 14 is released, with the result that the pipe 14 can be readily withdrawn. Such snap coupler 13 is one conventionally known.

The fluid discharging communication passage 5a is constituted in a same manner as the fluid supplying communication passage 4a, and a snap coupler 13 is also disposed within the fluid discharging communication passage 5a.

In this way, the fluid diverging block 1 includes the snap couples 13 incorporated in the left and right vertical cylindrical portions 4 and 5, respectively.

In connecting the two fluid diverging blocks 1 constructed in the above manner, two joints J are used. Each of the joints J is basically formed into a short cylindrical shape and comprises a joint block 17 which has, at its longitudinally opposite ends, a pair of cylindrical connections 17a, 17a fittable in the fluid supplying through-hole 2a or the fluid discharging through-hole 3a in the fluid diverging block 1. The joint block 17 has a flange portion 17b centrally provided on its outer surface and having an outside diameter larger than those of the connections 17a, 17a. The joint block 17 is provided with a joint through-hole 17c passing therethrough all the way from its front surface to its rear surface. An O-ring 18 as a seal member is disposed around an outer periphery of each of the connections 17a, 17a of the joint block 17. The joint J is comprised of the two O-rings 18 and the joint block 17.

If using two such joints J, the fluid supplying through-holes 2a and the fluid discharging through-holes 3a in the two fluid diverging blocks 1 are fitted over the connections 17a, 17a of the joints J from their front and rear, the two fluid diverging blocks 1 can be longitudinally coupled together in a laminated manner through two joints J. In this manner, four fluid diverging blocks 1 are coupled together in the illustrated embodiment.

A fluid diverging rear end block 19 is coupled through the two joints J to a rear surface of the rearmost (right end as viewed in FIGS. 3 and 4) one of the four fluid diverging blocks 1 coupled in the above manner. The fluid diverging rear end block 19 is comprised of a fluid diverging block 1, and a rear end closing member 20 for closing each of the rear ends of a fluid supplying through-hole 2a and a fluid discharging through-hole 3a both made in the fluid diverging block 1. Therefore, to provide this fluid diverging rear end block 19, it is only required to prepare a single rear end block member 20 separately. A fluid supplying bottomed hole 19a and a fluid discharging bottomed hole 19b as fluid bottomed holes are defined in the fluid diverging rear end block 19 by the both through-holes 2a and 3a and the rear end closing member 20. The fluid diverging rear end block 19 also has a fluid supplying rear end communication passage 19c and a fluid discharging rear end communication passage 19d as fluid rear end communication passages, which communicate with the fluid supplying bottomed hole 19a and the fluid discharging bottomed hole 19b from an upper surface of the fluid diverging rear end block 19, respectively. Of course, the fluid supplying end discharging rear end communication passages 19c and 19d are formed in the same construction as the fluid supplying and discharging communication passages 4a and 5a of the fluid diverging block 1 which is a component for the fluid diverging rear end bock 19. The rear end blocking member 20 comprises on its front surface, a pair of cylindrical connections 21, 21 fitted into the rear ends of the fluid supplying and discharging through-holes 2a and 3a, and O-rings 22, 22 as a seal member, each of which is disposed around the periphery of each of the connections 21, 21. The rear end blocking member 20 also includes a rearwardly extending plate element 23 at its lower end. The plate element 23 is provided with a mounting hole 23a.

A fluid access means connecting block 25 is coupled through two varied-diameter joints J' to a front surface of the frontmost one of fluid diverging blocks coupled in the above manner. The varied-diameter joint J' is basically constructed in the same manner as the above-described joint J, except that a cylindrical, front end side connection 24a thereof is formed at a diameter smaller than that of a rear end side connection 24a thereof. The varied-diameter joint J' further includes a larger diameter flange portion 24b and a joint through-hole 24d. The fluid access means connecting block 25 is formed from a hard synthetic resin similar to that of the fluid diverging blocks 1. The fluid access means connecting block 25 is provided with a fluid supply passage 26 and a fluid discharge passage 27 both passing therethrough from its front surface to its rear surface. Either or both of the fluid supply and discharge passages 26 and 27 stepped portions 26a and 27a each formed at a boundary between a front larger diameter portion and a rear smaller diameter portion thereof. The fluid access means connecting block 25 is also provided with a mounting hole 28 passing vertically through its central portion. A snap coupler 29 is disposed in the larger diameter portion of each of the fluid supply and discharge passages 26 and 27 and constructed in the same manner as the snap coupler 13. A fluid supply pipe 30 and a fluid discharge pipe 31 as fluid access means are mounted in the fluid supply passage 26 and the fluid discharge passage 27 by means of the snap couplers 29, 29.

The fluid access means connecting block 25, the fluid diverging block 1 and the fluid diverging rear end block 19 are integrally connected together by means of the joints J and the varied-diameter joints J'. The fluid diverging system U integrally constructed in this manner is fixed on a support plate 32 through securing means such as bolts and nuts by use of the mounting hole 23a in the plate element 23 and the mounting hole 28 in the fluid access means connecting block 25.

The operation and use of this embodiment will be described below.

A fluid, e.g., cooling water, supplied to the fluid supply pipe 30 is distributed from the fluid supply passage 26 through the joint through holes 24c, the fluid supplying through-holes 2a, the joint through-holes 17c and the fluid supplying bottomed hole 19 into the four fluid supplying communication passages 4a and the single fluid supplying rear end communication passage 19c. Then, the cooling water distributed into the fluid supplying communication passages 4a and the fluid supplying rear end communication passage 19c is supplied through the connecting pipe 14 and a fluid supply hose (not shown) or the like to predetermined sections to be cooled. After passing through the predetermined sections to be cooled, the cooling water is returned to the fluid discharging communication passage 5a or the fluid discharging rear end communication passage 19d. Then, it is passed through the fluid discharging bottomed hole 19b the joint through-holes 17c, the fluid discharging communication passages 3a and the joint through-hole 24c and discharged to the outside through the fluid discharge pipe 31.

The first embodiment has been described as being constructed of such that the cooling water is distributed to a total of five passages: the four fluid supplying communication passages 4a and the single fluid supplying rear end communication passage 19c, but it will be understood that if there is a need for increasing or decreasing the number of sections to which the cooling water is to be distributed the need can be readily accommodated by increasing or decreasing the numbers of the fluid diverging blocks 1 and the joints J between the fluid access means connecting block 25 and the fluid diverging rear end block 19. Accordingly, it is possible to use the fluid diverging system at a proper size at any time. If the fluid diverging block 1 is used for a component of the fluid diverging rear end block 19 as in the first embodiment, the manufacturing cost for the fluid diverging system can be reduced. In the first embodiment, this can be achieved by using the total of five fluid diverging blocks 1.

A second embodiment of the present invention will now be described with reference to FIGS. 6 to 13.

Referring to FIGS. 6 and 7, a fluid diverging system U' comprises a plurality of fluid diverging blocks 101 longitudinally coupled together. Each of the fluid diverging blocks 101 includes a pair of left and right horizontal cylindrical portions 102a and 102b longitudinally extending, and a fluid supplying through-hole 102c and a fluid discharging through-hole 102d which pass through the horizontal cylindrical portions 102a and 102b all the way from their front surfaces to their rear surfaces, respectively. More specifically, the fluid diverging block 101 includes a vertical cylindrical portion provided between the horizontal cylindrical portions 102a and 102b and having a fixing-bolt insertion through-hole 102e extending from its upper surface to its lower surface.

Further, the fluid diverging block 101 includes a fluid supplying rearwardly projecting pipe 103 and a fluid discharging rearwardly projecting pipe 104 both mounted on a rear surface (a surface located on the right side as viewed in FIGS. 7 and 8) of the block 101, and a pair of vertical cylindrical portions 105 and 106 provided on an upper surface of the block 101. Each of the fluid supplying and discharging rearwardly projecting pipes 103 and 104 have a larger diameter portions 103a, 104a on the base end side thereof, and a smaller diameter portion 103b, 104b having a cylindrical outer surface on the leading end side thereof, respectively. These rearwardly projecting pipes 103 and ^ ^ ^h vertical cylindrical portions 105 and 106 are ir ^grally formed from a suitable hard synthetic resin to constitute a body of the fluid diverging block 101.

As apparent from FIGS. 7 to 10, unlike the previously described embodiment, joint portions $J_{101}$ and $J_{102}$ as joints are incorporated within the horizontal cylindrical portions 102a and 102b of the fluid diverging block 101 in this embodiment. The joint portion $J_{101}$ is comprised of a cylindrical joint member 107 and an O-ring 108 as a seal member. The joint member 107 is formed from a suitable synthetic resin separately from the body of the fluid diverging block 101 and has a fluid supplying front connection hole 107a opened in a front surface of the fluid diverging block 101 in an assembled state. The fluid supplying front connection hole 107a is provided at its inner surface with an annular recessed groove 107b. The fluid supplying front connection hole 107a has an inside diameter sized to be fitted with an outside diameter of the fluid supplying rearwardly extending pipe 103. The O-ring is retained within the annular recessed groove 107b.

In the completely same manner as the joint portion $J_{101}$, the joint portion $J_{102}$ for the other horizontal cylindrical portion 102b is also formed from a cylindrical joint member 109 and an O-ring 110. The cylindrical joint member 109 has a fluid discharging front connection hole 109a opened in the front surface of the fluid diverging block 101 in the assembled state, and an annular recessed groove 109b made in an inner surface of the fluid discharging front connection hole 109a. An inside diameter of the fluid discharging front connection hole 109a is sized to be fitted with an outside diameter of the fluid discharging rearwardly projecting pipe 104. The cylindrical joint members 107 and 109 are buried in the fluid diverging bock 101. In other words, the cylindrical joints 107 and 109 are constructed to fit integrally with the fluid diverging block 101 and the rearwardly projecting pipes 103 and 104.

Accordingly, it is apparent from FIG. 7 to 10 that if the rearwardly projecting pipes 103 and 104 of a certain fluid diverging block 101 are inserted into the fluid supplying and discharging front connection holes 107a and 109a of another fluid diverging block 101, the smaller diameter portions 103b and 104b extending from the leading ends of the respective larger diameter portions 103a and 104a are clamped by the O-rings 108 and 110. This causes these fluid diverging blocks 101 to be fluid-tightly coupled to each other.

An interior of the fluid supplying rearwardly projecting pipe 103 and the fluid supplying front connection hole 107a in one fluid diverging block 101 are connected to each other by the fluid supplying through-hole 102c, while an interior of the fluid discharging rearwardly projecting pipe 104 and the fluid discharging front connection hole 109a are connected to each other by the fluid discharge through-hole 102d.

A fluid supplying communication passage 105a is defined in one of the vertical cylindrical portions 105 to pass therethrough from its upper end face to the fluid supplying through-hole 102c. A fluid discharging communication passage 106a is defined in the other vertical cylindrical portion 106 to pass therethrough from its upper end face to the fluid discharging through-hole 102d.

Figure 9:
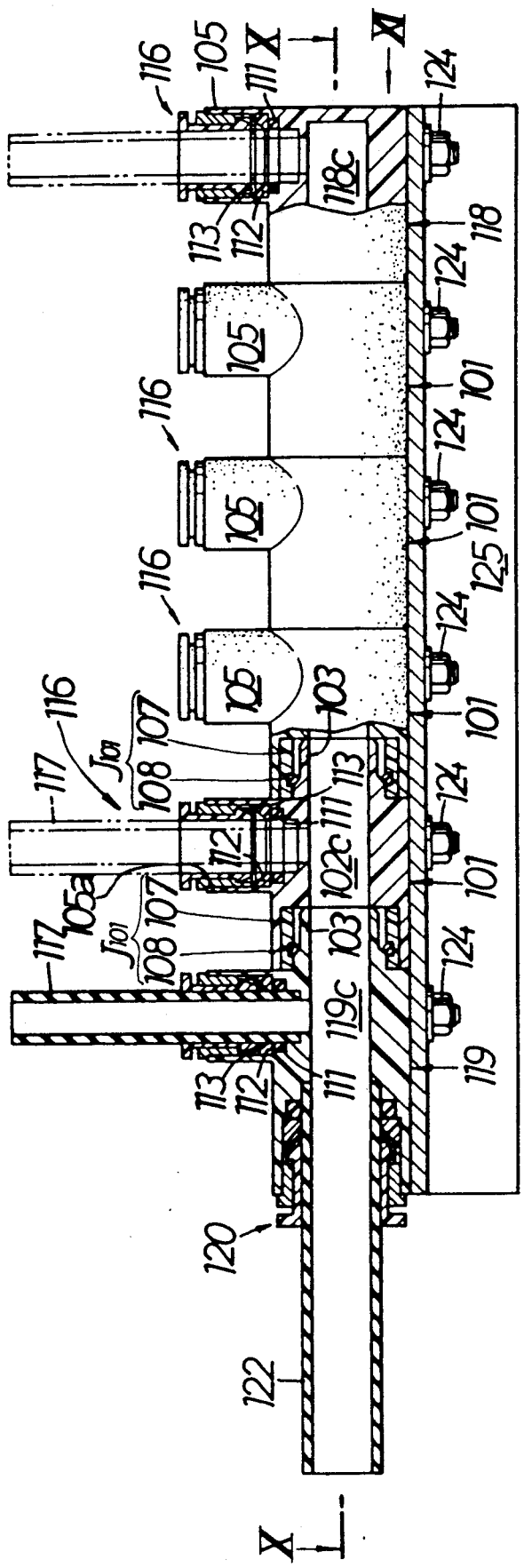
Figure 11:
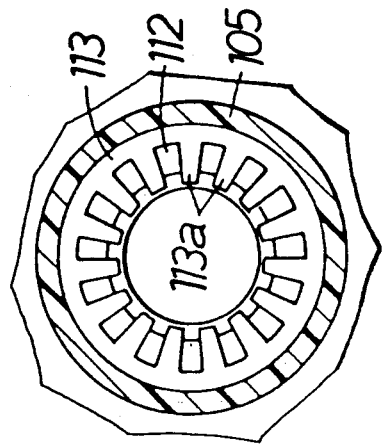
Figure 13:
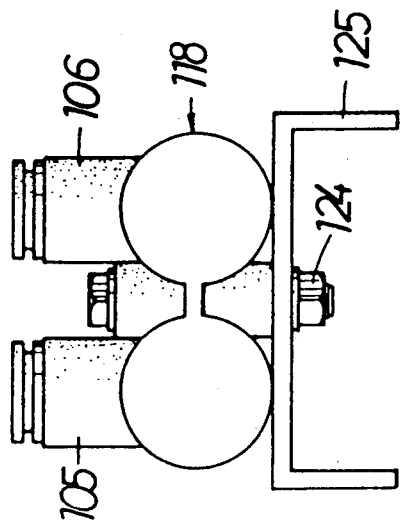
Figure 12:
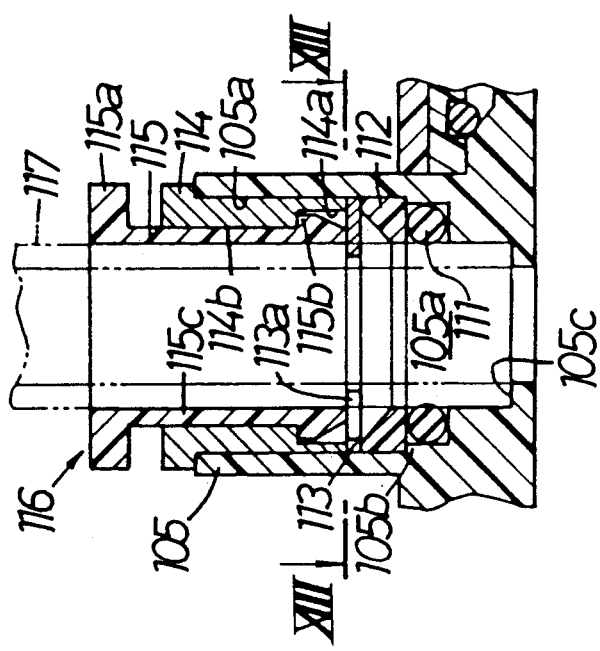

It can be seen from FIGS. 9, 12 and 13 that the fluid supplying communication passage 105a has an upper double-stepped portion 105b made at a boundary between the upper larger diameter portion and the lower smaller diameter portion, and a lower stepped portion 105c made at a lower end of the smaller diameter portion. An O-ring 111 as a seal member and a ring-like support member 112 are disposed in the double-stepped portion 105b. The ring-like support member 112 is provided at its upper surface with a conical surface inclined downwardly in a radially inward direction. A ring-like resilient locking member 113 of a metal material such as steel is disposed on an upper surface of the ring-like support member 112 and includes a large number of locking projection pieces 113a—which project radially inwardly as shown in FIG. 12. An outer cylindrical fixing member 114 of a metal and an inner cylindrical operating member 115 are placed on an upper surface of the ring-like locking member 113. The outer cylindrical fixing member 114 includes a larger diameter inner wall 114a on a lower, inner surface, and a smaller diameter inner wall 114b on an upper, inner surface. The outer cylindrical fixing member 114 is fixed to the vertical cylindrical portion 105 and clamps the ring-like locking member 113 between the upper surface of the ring-like support member 112. The inner cylindrical operating member 115 includes an upper end flange 115a, a lower enlarged end portion 115b, and an intermediate portion 115c of a smaller outside diameter. The lower enlarged end portion 115b is disposed inside the larger diameter inner wall 114a. In addition, the length of the intermediate portion 115c is longer by a predetermined amount than that of the smaller diameter inner wall 114b of the outer cylindrical fixing member 114 and therefore, the inner cylindrical operating member 115 is slidable axially, i.e., vertically by a predetermined amount within the outer cylindrical fixing member 114. Thus, if the inner cylindrical operating member 115 is pushed downwardly the locking projection pieces 113a flex downwardly from a horizontal state, so that the diameter of a circle described by leading ends of the locking projection pieces 113a is enlarged. If the downward pushing of the inner cylindrical operating member 115 is stopped, the locking projection pieces 113a are returned to their original states by a resilient force of the locking projection pieces 113a. A snap coupler 116 is thus formed from the components designated by the above-described reference characters 112 to 115.

A connecting pipe 117 connected to the fluid supplying communication passage 105a as shown in FIGS. 9 and 12 is formed with its outside diameter slightly larger than the diameter of a circle described by the leading ends of the locking projection pieces 113a in their horizontal states. As can be readily surmised from FIGS. 9, 12 and 13, if the connecting pipe 117 is pushed-in from above, the leading ends of the locking projection pieces 113a are bent downwardly so that the diameter of the circle defined by the leading ends is increased and hence, the connecting pipe 117 is passed through the resulting widened space with its leading end reaching the lower stepped portion 105c. In this state, even if a force acting upwardly pulls at the connecting pipe 117, the connecting pipe 117 cannot readily slip out of the fluid supplying communication passage 105a, because it is engaged by the leading ends of the locking projection pieces 113a of the ring-like locking member 113. To withdraw the connecting pipe 117 out of the fluid supplying communication passage 105a, the inner cylindrical operating member 115 may be pushed down to bend the locking projection pieces 113a downwardly. This causes the diameter of the circle defined by the leading ends of the locking projection pieces 113a to be increased and thus, the leading ends of the locking projection pieces 113a are separated from the connecting pipe 117. In this separated state, the connecting pipe 117 can be readily withdrawn out of the fluid supplying communication passage 105a.

The fluid discharging communication passage 106a is constructed in the same manner as the fluid supplying communication passage 105a, and a snap coupler 116 is disposed in the fluid discharging communication passage 106a.

Four fluid diverging blocks 101 having the above-described construction are coupled together in a laminated manner with the rearwardly projecting pipes 103 and 104 of each fluid diverging block 101 being fitted in the front connection holes 107a and 109a in another fluid diverging block 101. A fluid diverging rear end block 118 is coupled to a rear end of the rearmost one of the four fluid diverging blocks 101 coupled in this manner. This fluid diverging rear end block 118 is of such a construction that the rearwardly projecting pipe 103 and 104 of the fluid diverging block 101 are eliminated, and the rear ends of the fluid supplying and discharging through-holes 102c and 102d are closed. Specifically, the fluid diverging rear end block 118 includes, in a pair of left and right horizontal cylindrical portions 118a and 118b, a fluid supplying bottomed hole 118c and a fluid discharging bottomed hole 118d respectively corresponding to the shapes of the fluid supplying and discharging through-holes 102c and 102d of the fluid diverging block 101 with their rear ends closed. The other arrangements of the fluid diverging rear end block 118 is similar to that of the fluid diverging block 101. More particularly, the fluid diverging rear end block 118a comprises a fluid supplying rear end communication passage 118e and a fluid discharging rear end communication passage 118f both constructed in the same manner as the communication passages 105a and 106a in the fluid diverging block 101 and also includes a fixing bolt-insertion through hole 118g extending from its upper surface to its lower surface.

In addition, a fluid diverging front end block 119 is as a front end block is coupled to a front face of the foremost one of the aforesaid four fluid diverging blocks 101. This fluid diverging front end block 119 can function in the same manner as does the fluid access means connecting block in the previously described first embodiment. As shown in FIGS. 7 to 10, in place of the joint portions $J_{101}$ and $J_{102}$ in the fluid diverging block 101, left and right fluid supplying front connection hole 119a and fluid discharging front connection hole 119b are opened in a front face of the fluid diverging front end block 119 and snap couplers 120, 120 constructed in the same manner as the snap coupler 116 are disposed in the front connection holes 119a and 119b. Except for those respects, the fluid diverging front end block 119 is constructed substantially in the same manner as the fluid diverging block 101. In particular, the fluid diverging front end block 119 comprises a fluid supplying rearwardly projecting pipe 103, a fluid discharging rearwardly projecting pipe 104, a vertical cylindrical portion 105 having a fluid supplying front end communication passage 105a', and a vertical cylindrical portion 106 having a fluid discharging front end communication passage 106', all constructed in the same manner as those in the fluid diverging block 101. The fluid diverging front end block 119 also includes a fluid supplying through-hole 119c which connects an interior of the fluid supplying rearwardly projecting pipe 103 with the fluid supplying front connection hole 119a, and a fluid discharging through-hole 119d which connects an interior of the fluid discharging rearwardly projecting pipe 104 with the fluid discharging front connection hole 119b. Further, the fluid diverging front end block 119 includes a fixing bolt insertion through-hole 119e extending from its upper surface to its lower surface.

A fluid supply pipe 122 and a fluid discharge pipe 123 are mounted to the fluid diverging front end block 119 by the snap couplings 120, 120 disposed in the fluid supplying and discharging front connection holes 119a and 119b in the fluid diverging front end block 119.

The aforesaid fluid diverging block 101, the fluid diverging rear end block 118 and the fluid diverging front end block 119 are integrally coupled to one another by fitting the rearwardly projecting pipes 103 and 104 into the front connection holes 107a and 109a. A fluid diverging system U' integrally constructed in this manner is fixed to a support plate 125 by use of securing means 124 such as bolts and nuts passed through the fixing bolt insertion through-holes 102e, 118g and 119e.

According to such embodiment, a fluid, e.g., cooling water, supplied to the fluid supply pipe 122 is passed through the fluid supplying through-holes 119c and 102c, the interior of the fluid supplying rearwardly projecting pipe 103 and the fluid supplying bottomed hole 118c and distributed to the four fluid supplying communication passages 105a as well as the fluid supplying front end communication passage 105a' and the fluid supplying rear end communication passage 118e. Then, the cooling water distributed to these fluid supplying communication passages 105a, 105a' and 118e is supplied to predetermined sections to be cooled, through the connecting pipes 117 and a fluid supply hose which is not shown. After being passed through the predetermined sections to be cooled, the cooling water is returned to the four fluid discharging communication passages 106a as well as the fluid discharging front end communication passage 106a' and the fluid discharging rear end communication passage 118f. It is then passed through the fluid discharging bottomed hole 118d, the fluid discharging through-hole 102d and the interior of the fluid discharging rearwardly projecting pipe 104 and discharged from the fluid discharging pipe 123.

The second embodiment can provide an effect similar to that of the previously described first embodiment. Moreover, sealing between the through-holes in the adjacent fluid diverging blocks is achieved by the rear members integrally formed on these blocks and therefore, it is possible to further decrease the number of parts and to further simplify the assembling steps.

A third embodiment of the present invention will be described below with reference to FIGS. 14 to 17.

Figure 14:
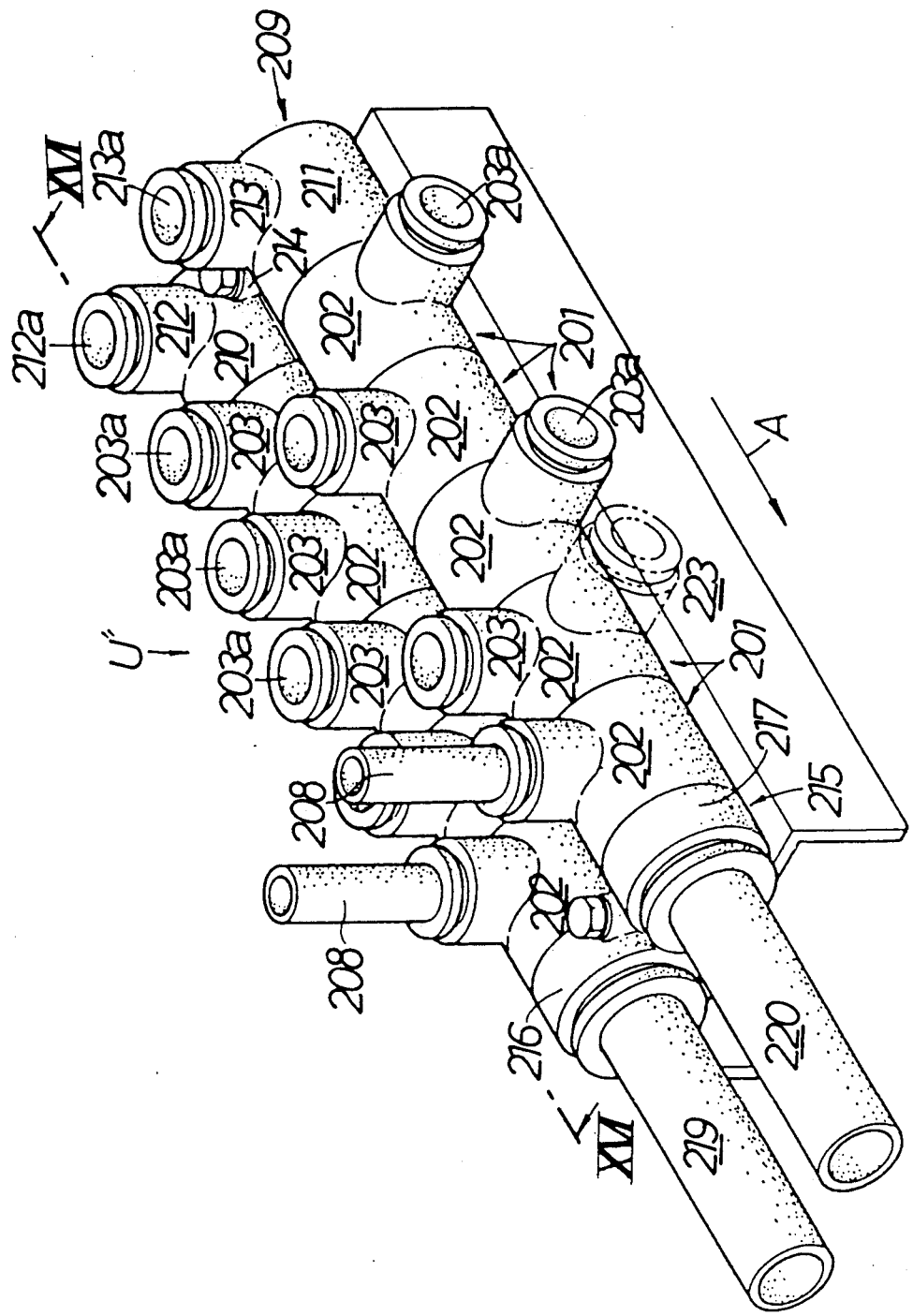
Figure 15:
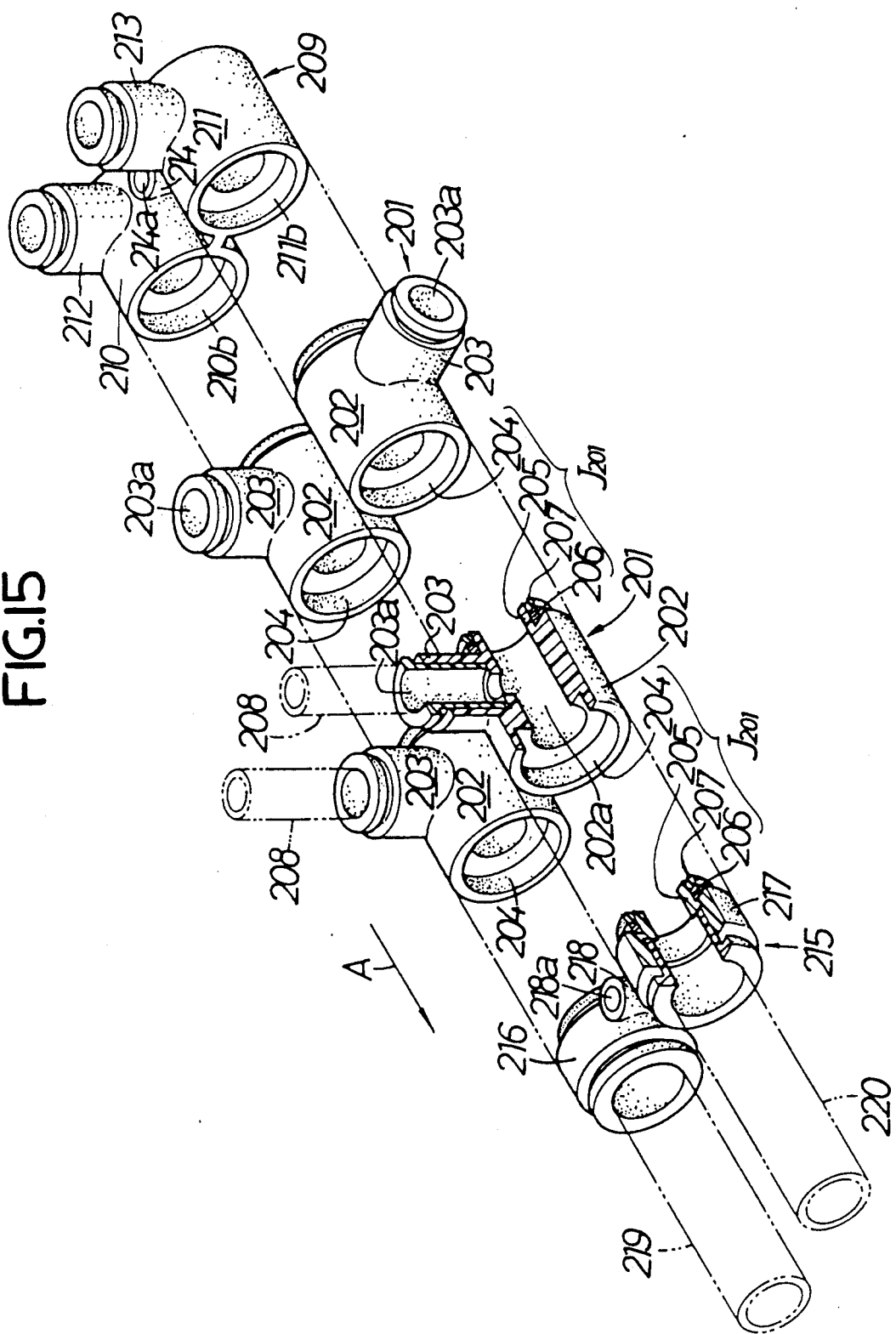
Figure 16:
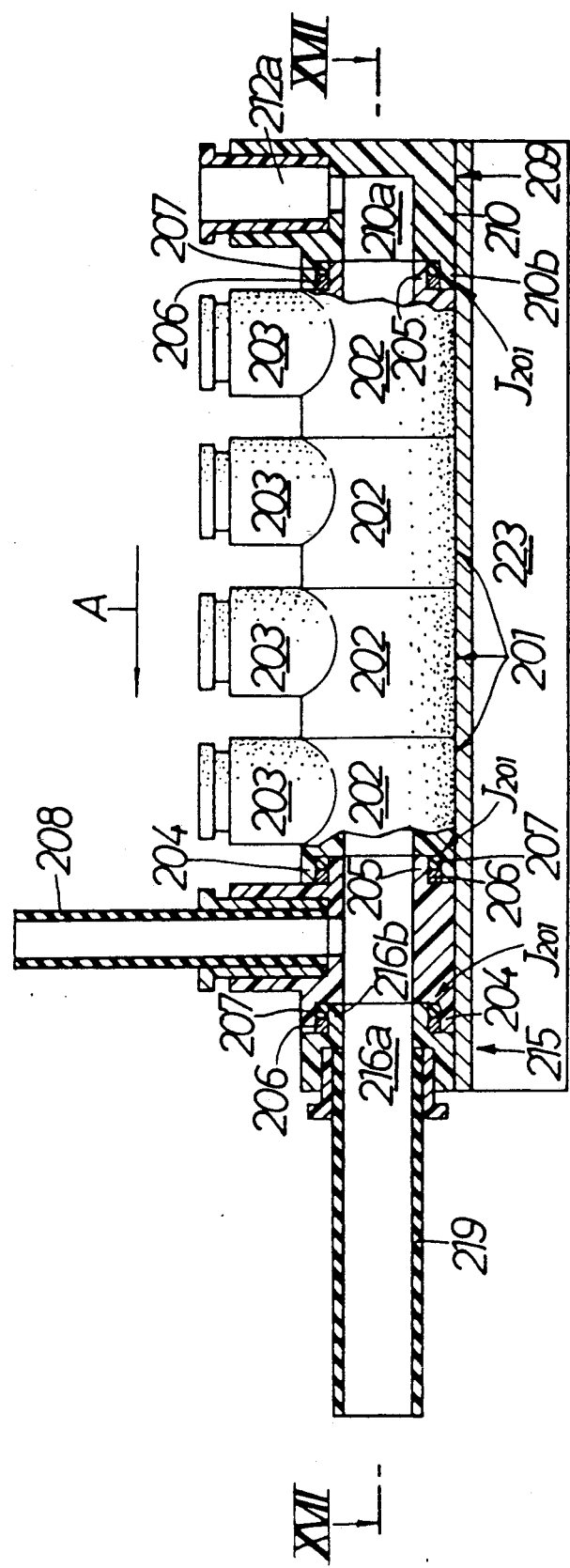
Figure 17:
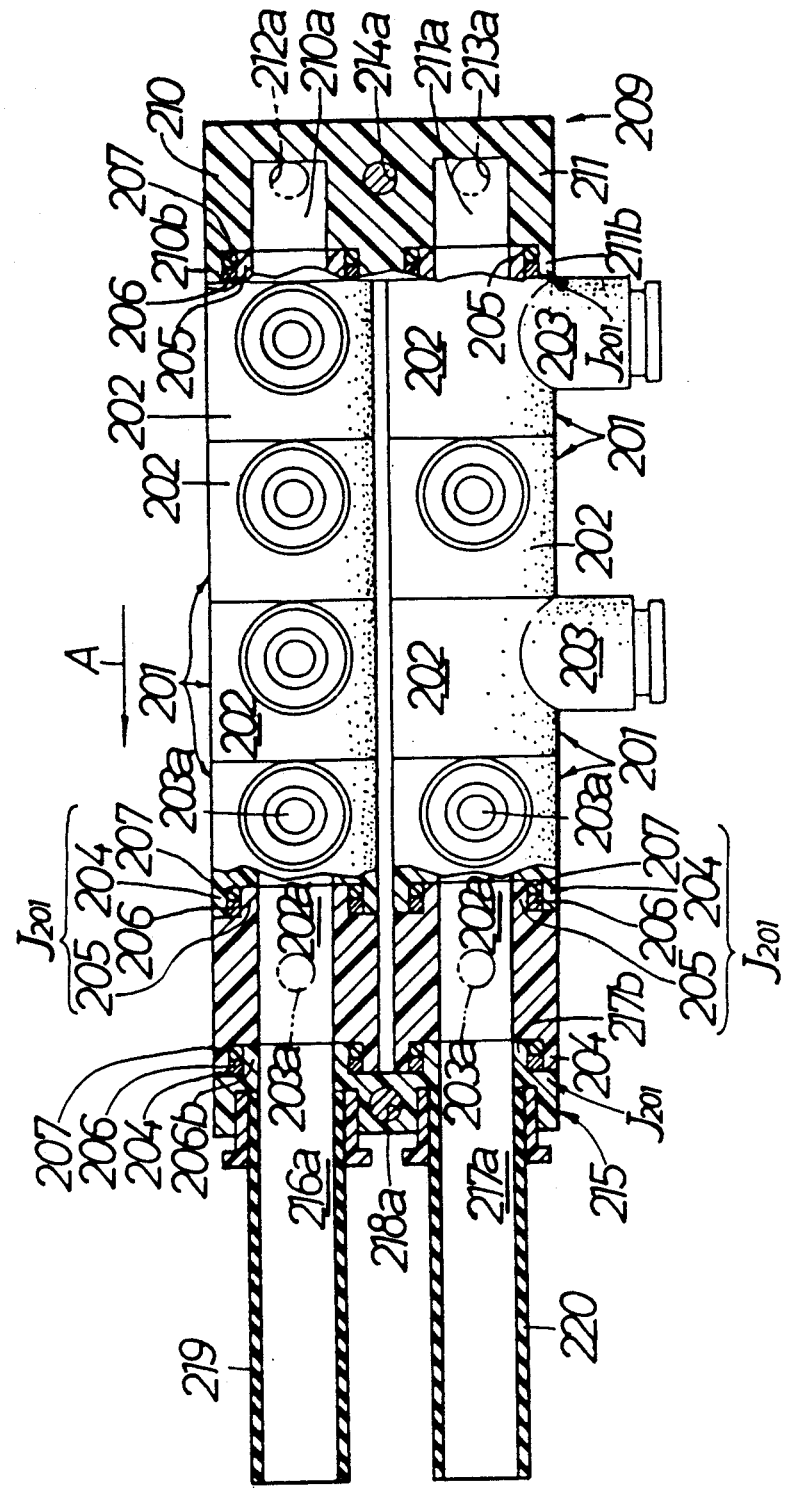

A fluid diverging system U" shown in FIG. 14 includes five pairs of fluid diverging blocks 201—arranged laterally in two rows on a support member 223 and coupled longitudinally (a direction of an arrow A being defined as a forward direction) to one another. In other words, the fluid diverging blocks 201 on fluid supply and discharge sides are provides separately from each other, unlike the previous first and second embodiments. Each of the fluid diverging blocks 201 includes a horizontal cylindrical portion 202 disposed with its axis directed longitudinally. The horizontally cylindrical portion 202 has a fluid through-hole 202a passing therethrough from its front surface to its rear surface. A vertical cylindrical portion 203 is mounted on an outer surface of the horizontal cylindrical portion 202 and has an axis perpendicular to the horizontal cylindrical portion 202. The vertical cylindrical portion 203 has a fluid communication hole 203a defined therein and connected to the fluid through-hole 202a. The fluid communication passage 203a is opened in a leading end face of the vertical cylindrical portion 203. Further, as seen from FIGS. 16 and 17, a cylindrical recess providing a front face connection 204 is provided in a front face of the horizontal cylindrical portion 202, and a cylindrical protrusion providing a rear face connection 205 is provided on a rear face of the horizontal cylindrical portion 202. The fluid diverging block 201 constructed from the components designated by the above-described reference characters 202 to 205 is integrally formed from a hard synthetic resin. The rear face connection 205 formed as the cylindrical protrusion is formed so that it can be fluid-tightly fitted in the front face connection 204 formed as the cylindrical recess in the adjacent rear block 201 through a bearing ring 206 and an O-ring 207 as a seal member for relative rotation about the axis of the cylindrical portion 202. A connecting pipe 208 for piping is inserted and fitted in an outer opening of the fluid communication passage 203a.

The fluid diverging blocks 201 are coupled to one another with the front face connection 204 of one fluid diverging block 201 being connected to the rear face connection 205 of another fluid diverging block 201 and so on. It can be seen from FIGS. 16 and 17 that in connecting in such a manner, the bearing ring 206 and the O-ring 207 are interposed between these connections. A joint portion $J_{201}$ as a joint is constructed by the front and rear face connections 204 and 205, the bearing ring 206 and the O-ring 207.

The five pairs of fluid diverging blocks 201 longitudinally connected through the joints $J_{201}$ in this manner are arranged laterally in the two rows as shown in FIG. 14. The fluid through-holes 202a in the fluid diverging blocks 201 longitudinally connected in each of the left and right rows are in communication with one another.

A fluid diverging rear end block 209 is disposed on a rear face of the rearmost (right end as viewed in FIG. 14) one pair of the fluid diverging blocks 201 in each of the left and right rows. The fluid diverging rear end block 209 comprises a pair of left and right horizontal cylindrical portions 210 and 211 extending longitudinally. Each of the horizontal cylindrical portions has a bottomed fluid hole 210a, 211a (see FIGS. 16 and 17) made therein with its front face opened and its rear face closed. In addition, front faces of the horizontal cylindrical portions 210 and 211 are also formed with front face connections 210b and 211b, respectively. Each front face connection 210b, 211b is formed as a cylindrical recess completely similar to the front face connection 204 of the fluid diverging block 201. The rear face connections 205, 205 of two, disposed at the rear end, of the pair of fluid diverging blocks 201 longitudinally connected in the above manner and arranged laterally in the two rows are connected to the front face connections 210b and 211b of the fluid diverging rear end block 209 through the bearing ring 206 and the O-ring 207, respectively. A joint portion $J_{201}$ is likewise constructed by the front face connection 210b, 211b, the rear face connection 205, the bearing ring 206 and the O-ring 207. In the state of the fluid diverging rear end block 209 connected to the fluid diverging block 201 in this manner, the pair of bottomed fluid holes 210a and 211a are independently connected respectively to the fluid through-holes 202a, 202a in the two fluid diverging blocks 201 arranged side by side. The fluid diverging rear end block 209 is also provided with a pair of vertical cylindrical portions 212 and 203 which have rear end fluid communication passages 212a and 213a provided therein and communicating with the bottomed fluid holes 210a and 211a, respectively. Further, a cylindrical mounting portion 214 having a mounting hole 214a is provided in the fluid diverging rear end block 209 between the vertical cylindrical portions 212 and 213.

In addition, a front end block 215 is coupled to a front face of the foremost pair (at a left end as viewed in FIGS. 14 and 15) of the five fluid diverging blocks 210 longitudinally connected in the above manner and arranged laterally in each of the two rows, and enables a connection of the blocks with a connecting pipe as connecting means. The front end block 215 includes a pair of left and right longitudinally extending horizontal cylindrical portions 216 and 217 which have front end through-holes 216a and 217a made therein, respectively. Rear faces of the horizontal cylindrical portions 216 and 217 are provided with a pair of rear face connections 216b and 217b which are each formed as a cylindrical protrusion similar to the rear face connection of the fluid diverging block 201. The front face connections 204, 204 of two, disposed at the front end, of the fluid diverging blocks 201 in the laterally two rows are connected to the rear face connections 216b and 217b through the bearing ring 206 and the O-ring 207, respectively. A joint portion $J_{201}$ is likewise constructed by the rear face connection 216b, 217b, the front face connection 204, the bearing ring 206 and the O-ring 207. In a state of the front end block 215 connected to the fluid diverging blocks 201, 210 in this manner, the front end through-holes 216a and 217a are connected to fluid through-holes 202a, 202a in the left and right fluid diverging blocks 210, respectively. Further, a mounting portion 218 having a mounting hole 218a is provided on the front end block 215. Connecting pipes 219 and 220 are inserted and fitted in front ends of the front end through-holes 216a and 217a in the front end block 215.

In this embodiment, the five pairs of fluid diverging blocks 201 longitudinally connected one on another are arranged in two rows, with the front end blocks 215 free from the fluid communication passage being connected to the front end of the fluid diverging blocks 201 and with the fluid diverging rear end block 209 having the fluid rear end communication passages 212a and 213a being connected to the rear end of the blocks 201. The fluid diverging system U" constructed of the individual blocks 210, 209 and 215 integrally connected in this manner is fixed to the support member 223 by securing means such as bolts and nuts passed through the mounting holes 214a and 218a. In the fluid diverging system U" of this third embodiment, one of the connecting pipes 219 is in communication with the front end through-hole 216a, the five continuously connected fluid through-holes 202a,—and the bottomed fluid hole 210a. Thus, the connecting pipe 219 is in communication with the five fluid communication passages 203a and the fluid rear end communication hole 212a. Likewise, the other connecting pipe 220 is in communication with the five fluid communication passages 203a communicating with the five fluid through-holes 202a,—, and the fluid rear end communication passage 213a communicating with the bottomed fluid hole 211a. One of two rows of passageways provided by the fluid through-hole 202a, the fluid communication passage 203a, the bottomed fluid holes 210a and 211a and the fluid rear end communication passages 212a and 213a is used for supplying a fluid, and the other row is used for discharging the fluid.

Description will be made of the operation of the third embodiment of the fluid diverging system having the above-described construction according to the present invention.

In the fluid diverging system U", if a fluid, e.g., cooling water is supplied to the one connecting pipe 219, the cooling water is passed through the five fluid communication passages 203a in one of the rows connected to the connecting pipe 219 and cools a plurality of sections required to be cooled (not shown) and then, is passed through the five fluid communication passages 203a in the other row and the fluid rear end communication passage 213a and recovered from the connecting pipe 210. With this embodiment, the cooling water supplied to the connecting pipe 219 is distributed to the five fluid communication passages 203a and the single fluid rear end communication passage 212a, but if there is a need for increasing or decreasing the number of the communication passages, the number of the fluid diverging blocks 201 may be increased or decreased as in the previous first and second embodiments. In addition, the direction of any one or more of the fluid communication passages 203a can be changed by properly rotating the fluid diverging blocks 201 about the axis of the horizontal cylindrical portion 202. This leads to a facilitated piping and a simplified connecting operation for such piping and a simplified connecting operation for such piping.

While the embodiments of the present invention have been described above, it will be understood that the present invention is not limited to the above embodiments, and various minor modification in design can be made without departing from the spirit and scope of the present invention as set forth in the claims.

Figure 18:
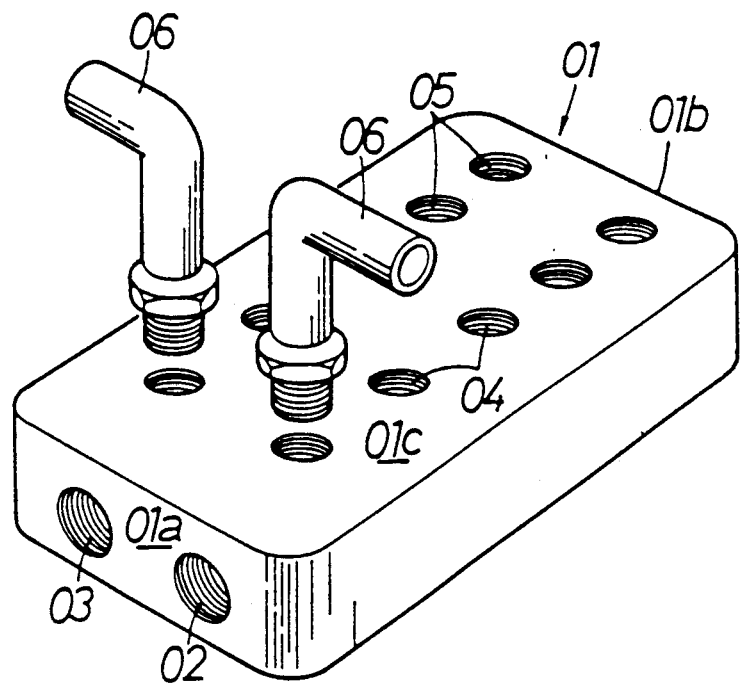
FIG. 18 is a perspective view of the prior art fluid diverging system.

For example, the fluid diverging system in each of the above embodiments can be, of course, used as a fluid diverging system in which air is distributed in place of the cooling water. If the fluid is, for example, air consumed at welding sections, or a cooling oil discharged at cutting sections, such fluid need not be circulated to the fluid diverging system. Therefore, the fluid discharging through-hole 3a, 102d, 202a, the fluid discharging communication passage 5a, 106a, 203a, the fluid discharging bottomed hole 19b, 118b, 211a, the fluid discharging rear end communication passage 19d, 118d, 213a and the like can be used as those for supplying a second fluid. In addition, the number of the fluid diverging blocks 1, 101, 201 longitudinally coupled is not limited to that shown and described in each of the above embodiments and can be any number. Further, although the snap coupler has been used in each of the above first and second embodiments in connecting the connecting pipe 14, 117 to the fluid communication passages 4a, 5a; 105a, 106a and the fluid rear end communication passages 19c, 19d; 118e, 118f, it is of course possible to replace such means, for example, by means such as the hose connecting member 06 shown in FIG. 18. Alternatively, it is possible to use a mere fitting type as in the third embodiment depending upon an application.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A fluid diverging system comprising:
   a plurality of fluid diverging blocks separably connected longitudinally in a row to one another and each having a horizontal cylindrical portion with a through-hole longitudinally passed therethrough and a communication passage communicating with said through-hole and capable of being connected to external fluid transfer means;
   each cylindrical portion having an axis aligned with an axis of a horizontal cylindrical portion of another fluid diverging block in a connected state of said fluid diverging blocks;
   means for closing a rear end of the through-hole of a rear end one of said fluid diverging blocks;
   joint means mounted at least between the individual adjacent two of said plurality of the fluid diverging blocks to connect said fluid diverging blocks and to put the through-holes in said fluid diverging blocks into fluid-tight communication with one another; and
   adjacent fluid diverging blocks are relatively rotatable about the axes of their horizontal cylindrical portions in an assembled state.

2. A fluid diverging system according to claim 1, wherein a block having fluid access means connected thereto is coupled to a foremost one of said plurality of fluid diverging blocks.

3. A fluid diverging system according to claim 2, wherein said block having said fluid access means connected thereto has a passage which is fluid-tightly connected to the through-hole in the foremost fluid diverging block through the joint means.

4. A fluid diverging system according to claim 1, wherein said joint means comprises a cylindrical recess provided around one of opposed open ends of the through-holes in the two adjacent fluid diverging blocks, a cylindrical protrusion projecting from the periphery of the one open end and fitted in said cylindrical recess, and a seal member interposed between said cylindrical recess and protrusion.

5. A fluid diverging system according to claim 4 wherein said seal member is an O-ring fixed in an annular groove provided in one of said cylindrical recess and protrusion.

6. A fluid diverging system according to claim 1, further including a snap coupler mounted in an opened end of each of said communication passages to the outside.

7. A fluid diverging system according to claim 1, wherein said fluid diverging blocks are provided in two sets for supplying and discharging a fluid, and the two sets of the fluid diverging blocks are arranged laterally in two rows.

8. A fluid diverging system according to claim 7, wherein said rear end closing means is commonly used for the rear end two of the two rows of fluid diverging blocks.

9. A fluid diverging system according to claim 8, wherein said rear end closing means includes therein, two bottomed holes independently communicating with the through-holes in said two rear end fluid diverging blocks, and two communication passages communicating with said bottomed holes and capable of being connected to the external fluid transfer means, respectively.

* * * * *